May 29, 1951     H. W. TREVASKIS     2,555,207
DEVICES FOR ACTUATING BRAKE CABLES OR LIKE MEMBERS
FOR TRANSMITTING MOTIONS
Filed Oct. 16, 1948     3 Sheets-Sheet 1

INVENTOR
Henry William Trevaskis
by Benj. T. Rauber
his attorney

Patented May 29, 1951

2,555,207

UNITED STATES PATENT OFFICE 2,555,207

DEVICE FOR ACTUATING BRAKE CABLES OR LIKE MEMBERS FOR TRANSMITTING MOTIONS

Henry William Trevaskis, Solihull, England, assignor to Dunlop Rubber Company Limited, London, England, a British company Application October 16, 1948, Serial No. 54,942
In Great Britain November 1, 1947

3 Claims. (Cl. 74—489)

This invention relates to devices for actuating brake cables or like members for transmitting motion. More particularly the invention relates to such a device to be attached to the control column of an aeroplane and to actuate a cable connected to landing wheel brakes for operation thereof.

Due to space in the aeroplane cabin or cockpit being confined it is desirable that hand lever devices, whilst being readily accessible to the pilot, should not project from their supports sufficiently to obstruct his movements.

An object of the invention is to provide a device which is of compact construction and when attached to a support does not project unduly therefrom.

According to the present invention a device for actuating a brake cable or like member for transmitting motion comprises a hand lever and a support therefor in which one end of the hand lever is constrained to move along a straight line and a part of the lever intermediate its two ends is constrained to move over a predetermined path whereby the said hand lever is angularly movable relative to said support.

Preferably the said support is a plate with a straight slot therein and a cam formation on its periphery and the hand lever carries intermediate its ends a roller for engagement with the cam formation, one of the ends of the lever being formed with a pivot slidable in the slot of the plate and being adapted to be connected to the cable.

In one embodiment of the invention the device comprises the plate member and a lever having a handle portion and a bifurcated portion which straddles the plate; in this construction the roller for engagement with the cam surface is mounted between the bifurcations near their junction with the handle portion and a second roller is mounted between the ends of the two bifurcations and is disposed within the slot of the plate member, this roller constituting the slidable pivot and the slot in which it is accommodated defining the straight line path along which the pivot moves. The second roller may be constrained to move over the cam surface when the lever is moved angularly, by providing a second slot in the plate, located for example between the first-mentioned slot and the cam surface, and a pin between the bifurcations of the lever engaging the second mentioned slot. The shape of the second slot and the shape of the cam surface are such that when the brake lever is moved to apply the brakes, or to release them, the one roller moves over the cam surface and the other roller moves along the slot in the plate.

The device of the invention is suitable for attachment to a control column such as that of an aeroplane or the brake handle of a motor vehicle. The device should be mounted so that the straight line path in which the one end of the hand lever is constrained to move is parallel to the axis of the column. In some cases the device may be formed with a band clip attached to the support by which the device can be attached to the control column. Alternatively the control column to which the device is to be attached can be constructed with bored lugs and the rigid member with a series of holes capable of being brought into register with the bored lugs; the device can then be fixed to the control column by means of bolts passing through the holes.

A further modification, applicable in the case of an aeroplane, is to form the grip of the control column separately from the remainder of the control column with suitably disposed lugs to which the rigid member of the hand lever device is attached as described above. The device will then be attached to the grip of the control column which will in turn be affixed to the main portion of the control column. In any of these forms of this invention in which the device is fixed to a handle or control column and the rigid member is in the form of a plate, one edge of the plate is substantially straight, and is fixed to the control column so that it lies in the plane containing the axis of the handle with the straight edge against the handle or control column with the hand lever extending upwardly in a position such that the grip of the control column or handle and the hand lever can be gripped simultaneously. In such an arrangement the cam formation will be on the upper edge of the plate and the slot in which the pivot of the lever moves will extend from adjacent the lower face of the plate upwardly to a point below the top edge of the plate.

Preferably the device according to the invention also incorporates a means for retaining the hand lever in a pre-selected position, for example in a position where the brakes can be maintained fully applied, without gripping the lever. This result may be obtained by providing a lug projecting from one face of the lever in which a set screw is mounted with its axis parallel to the slot in which the roller intermediate the ends of the lever is located and a detent movably mounted in a seating integral with the rigid member so that it can be moved to one position clear of the set screw, thus permitting the brake to be applied or released partially or completely as desired, or to a second position where the detent lies across the path of the set screw so that when the hand lever is released the set screw bears against the detent and thus prevents the brakes from being released. Adjustment of the pre-selected position can be made by adjusting the position of the set screw. Instead of making the mounting of the detent integral with the device the detent mounting may form part of the control column, or other supporting member to which the device is attached.

The invention will be further described with reference to the accompanying drawings showing a device for actuating a brake cable in position on the handle of a control column of an aeroplane. In these drawings—

Fig. 4 is a cross-section on an enlarged scale taken on the line AA of Fig. 3 with the hand lever in the "parking" position.

Figure 1:
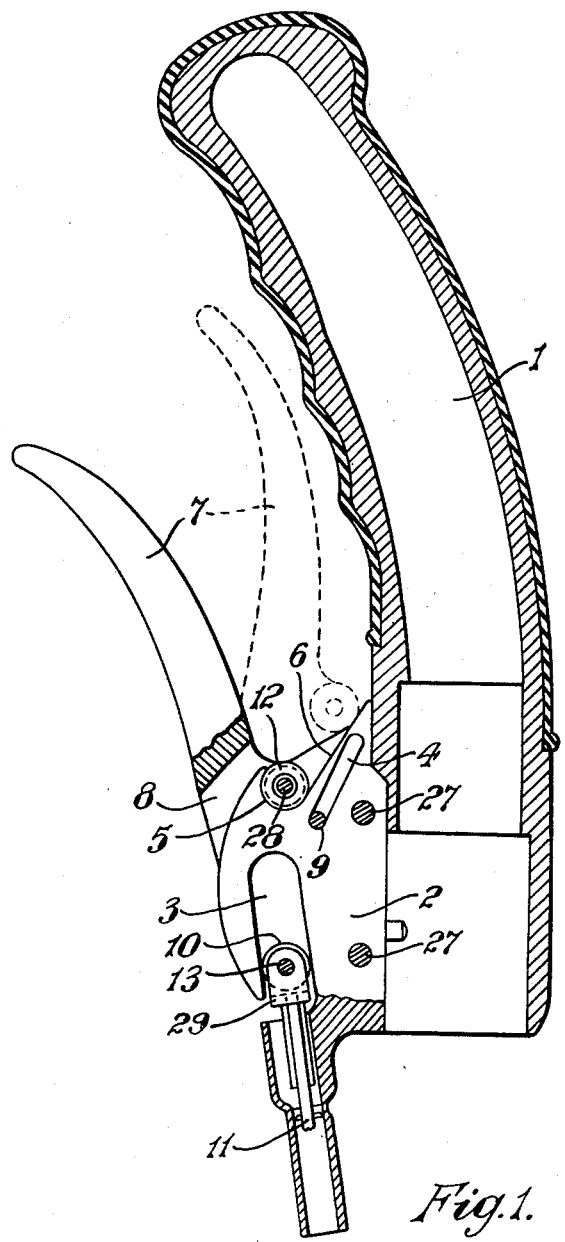
Fig. 1 is a cross-section of the device attached to a control column showing the cam plate, the brake being in the "off" position.

In these drawings the control column handle 1 (see Figures 1 and 2) is formed on one side with a protuberant portion having a slot extending parallel to the axis of the column, in which slot a plate 2 is fixed by bolts 27, the sides of the plate extending axially of the column. A slot 3 is formed from side to side in the plate 2; the slot is open at the lower end and extends upwards approximately parallel with the axis of the control column for rather more than half the height of the plate 2. A second slot 4 is provided in the upper part of the plate 2 and is closed at both ends, this slot being substantially straight but inclined to the axis of the control column. The upper edge of the plate 2 is shaped to form a stop 5 where it meets the outer edge and a cam surface 6 extending towards the grip of the control column. Lever 7 has an upper slightly bowed handle portion and a lower end portion which is centrally grooved from the lower end upwards to form two sides plates 8—8 disposed one on each side of the plate 2. The lever thus straddles the plate 2. It is retained in position on the plate 2 by a pin 9 passing through the slot 4 and having its ends in the side plates 8—8. In the slot 3 is a roller 10 mounted by ball bearings on a pin 13 disposed transversely of the axis of the control column and supported by the said plates 8, 8, and also mounted on the same pin is a yoke-piece 29 which straddles the roller 10 and is secured to a cable 11 connected to the wheel brake mechanism. Another roller or cam follower 12 is similarly mounted on a pin 28 between the side plates 8—8 parallel with the roller 10 and the said roller 12 is in contact with the cam surface 6 of the plate 2. The pins 13 and 28 have a head at one end and the heads abut against the outer face of one side plate 8 while the other end of each pin has a circular groove, the grooves being both engaged by a substantially U-shaped spring clip 14 which lies against the outer face of the other side plate 8 and retains the pins in position.

Figure 2:
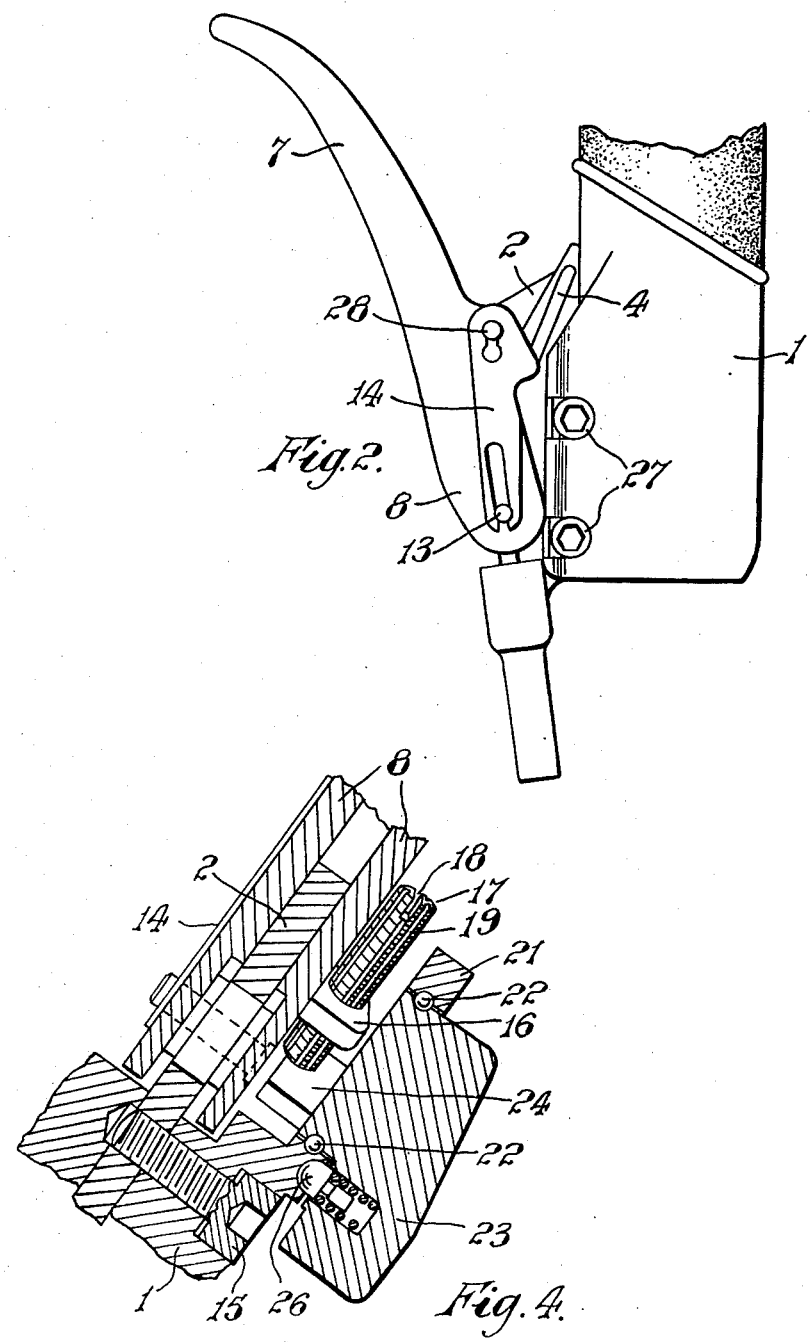
Fig. 2 is a side view of the device shown in Fig. 1 the brake being in the "off" position.
Figure 3:
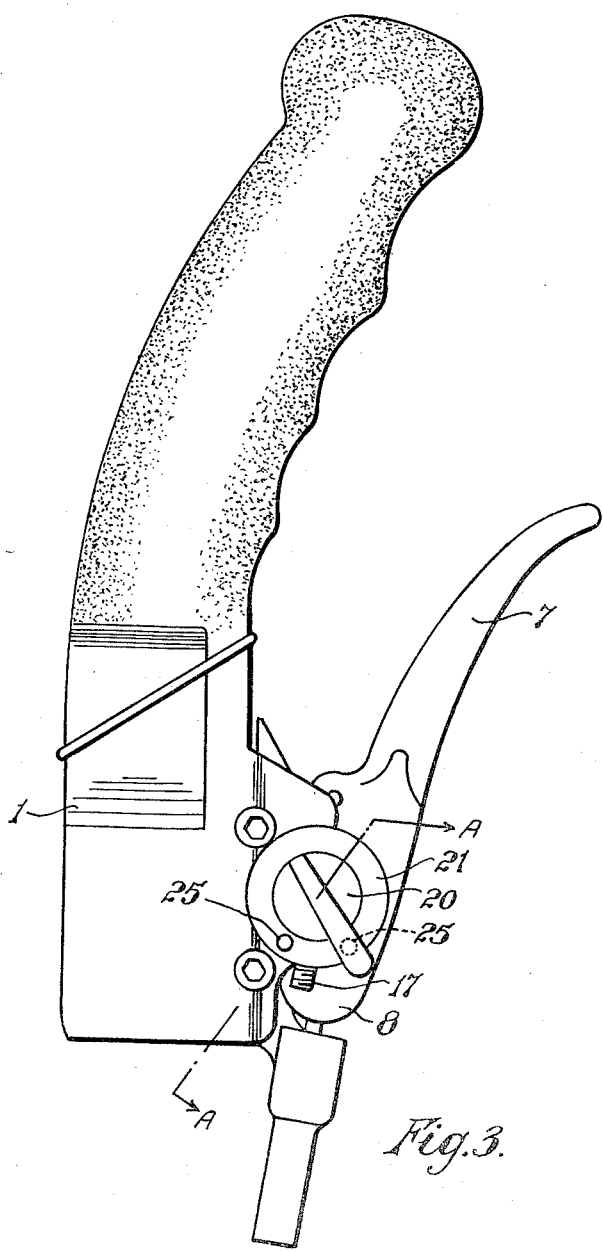
Fig. 3 is a side view of the device as seen from the side opposite to that depicted in Fig. 2, the brake being in the "off" position.

When the lever 7 is in the "off" position as shown in Figures 1, 2, and 3, the roller 12 is against stop 5, roller 10 is at the lower end of slot 3, and the pin 9 is at the lower end of the slot 4. As the brakes are applied by moving the handle portion of brake lever 7 towards the grip of the control column the movement of the lever is constrained by pin 9 to cause the roller 12 to move along the cam surface 6 and the roller 10 to move upwards in slot 3. The co-operation of the cam surface 6 and the roller 12 causes the end of the lever connected to the cable to move in a direction parallel to the slot 3 and substantially axially of the cable 11 thus exerting a pull thereon.

Integral with the lever 7 and projecting from the outer face of one side plate 8 is a lug 16 (see Fig. 4) formed with a screw-threaded hole, the axis of which is approximately parallel with the axis of the control column and said hole is engaged by a set-screw 17 which projects at both ends beyond the lug and at one end has a screwdriver slot 18. The set-screw is formed in its periphery with eight longitudinally extending slots 19 adapted to be separately snap-engaged by a bowed clicker spring (not shown) retained in a slot formed in the lug.

Disposed adjacent the outer side of the lug 16 is a rotatable member formed with a circular disc portion 20 (see Figures 3 and 4) the axis of which is parallel with the axis of the rollers 10 and 12; said disc portion is mounted in a bearing boss 21 rigid with the protuberance of the control column and is retained in the bearing boss by a ball race 22 located in complementary grooves in bearing boss 21 and disc portion 20. A knob 23 is formed on the face of the disc remote from the set-screw 17 and a detent 24 projects from the other face of the disc adjacent its periphery for a purpose described subsequently. Two depressions 25 formed in the bearing boss 21 are angularly spaced apart relatively to the axis of the member 20 and a spring-loaded ball 26 is carried by said knob 23 to co-operate with the depressions.

With the lever 7 in the normal off position, the detent 24 is clear of the screw 17 permitting the brake lever to be applied and released as desired. If, however, while the brake lever is depressed so that the brakes are fully on, the knob 23 is moved from the position shown in Figure 3 until the spring-loaded ball 26 enters the other depression 25, the detent 24 is brought beneath the end of screw 17. Only a partial release of the brake lever 7 is then possible the extent depending upon the position of screw 17 relative to the lug 16. The screw 17 is normally adjusted by means of the screwdriver slot 18 so that when it abuts against the detent 24, the brakes are in their parking position.

In using the brake device, assuming that it is in the off position with the knob 23 thus in the position shown in Figure 3, the brakes are applied when desired by gripping the grip of the control column 1 and the lever 7 so that the latter is moved towards the control column; the pin 9 then moves along the slot 4 to the upper end thereof and the brakes are applied as has been described above. During this movement the end of the screw 17 visible in Figure 3 moves upwards to the position shown in Figure 4 in which its lower end is above the axis of the circular disc 20, and thus above the position which the detent 24 will assume when the knob 23 is moved to the position shown in Figure 4. So long as knob 23 is in the position shown in Figure 3 the brakes can be released or applied to the full extent or any partial extent desired, e. g. while landing. When the aeroplane has been brought to rest and it is desired to leave the brakes fully applied for parking, the knob 23 is moved over to the position shown in Figure 4 so that the detent 24 lies across the path of screw 17. On releasing the brake lever 7 the brakes will be maintained fully applied, since screw 17 will abut against the detent 24. If desired a lug may be provided projecting inwards from the upper part of bearing 21, as seen in Figure 3, to limit the upward movement of screw 17 and thus the maximum extent of application of the brakes.

Having described my invention, what I claim is:

1. Apparatus for actuating a cable which comprises a fixed supporting plate having a slot and a cam surface, a hand actuated lever bifurcated to straddle said plate, said lever having a cam follower mounted between the bifurcated part of said lever to engage said cam and a roller mounted between said bifurcated part of said lever to engage said slot and an adjustable stop on said lever and a rotatable detent mounted relative to said plate to move into and out of position to engage said adjustable stop.

2. Apparatus for actuating a cable which comprises a fixed support having a guide plate, said guide plate having a guide slot and a cam surface, a hand operated lever having a cam follower engaging said cam surface and a roller engaging said slot, a threaded adjustable stop mounted on and movable with said lever and a knob rotatably mounted on said support and having a projecting detent, said detent being positioned in one position of rotation of said knob to one side of said stop and in another position of said knob in the path of said stop.

3. Apparatus for actuating a cable which comprises a supporting and guiding plate having a slot and a cam surface, a hand lever being a cam follower engaging said cam surface and a roller engaging said slot, a lug projecting from one face of said lever, a set screw mounted in said lug with its axis parallel to said slot, a detent movably mounted relative to said plate and movable from a position clear of said screw to a position to stop said screw.

HENRY WILLIAM TREVASKIS.

REFERENCES CITED

The following references are of record in the file of this patent:

UNITED STATES PATENTS

| Number | Name | Date |
|---|---|---|
| 634,493 | Bradley | Oct. 10, 1899 |
| 656,140 | Kennedy | Aug. 14, 1900 |

FOREIGN PATENTS

| Number | Country | Date |
|---|---|---|
| 186,124 | Switzerland | Nov. 16, 1936 |
| 190,766 | Great Britain | Jan. 2, 1923 |
| 345,449 | France | Nov. 30, 1904 |